United States Patent [19]
Nishizawa et al.

[11] Patent Number: 5,805,214
[45] Date of Patent: *Sep. 8, 1998

[54] ULTRA SMALL VIDEO CAMERA AND A VIDEO CAMERA SYSTEM IN USE THEREOF

[75] Inventors: Akihito Nishizawa, Yokosuka; Takuya Imaide, Fujisawa; Toshiro Kinugasa, Hiratsuka; Takuya Iguchi, Yokohama; Kazuhiro Koshio, Chigasaki, all of Japan

[73] Assignee: Hitachi, Ltd., Tokyo, Japan

[*] Notice: The term of this patent shall not extend beyond the expiration date of Pat. No. 5,646,684.

[21] Appl. No.: 831,304

[22] Filed: Apr. 1, 1997

Related U.S. Application Data

[63] Continuation of Ser. No. 512,625, Aug. 8, 1995, Pat. No. 5,646,684.

[30] Foreign Application Priority Data

Aug. 22, 1994 [JP] Japan .................................. 6-196447
Aug. 22, 1994 [JP] Japan .................................. 6-196805

[51] Int. Cl.$^6$ ...................................................... H04N 5/76
[52] U.S. Cl. ......................... 348/231; 348/233; 348/239
[58] Field of Search ................................... 348/222, 231, 348/233, 239, 240, 372; 358/909.1, 906; H04N 5/228, 5/76

[56] References Cited

U.S. PATENT DOCUMENTS

| | | | |
|---|---|---|---|
| 5,067,029 | 11/1991 | Takahashi | 348/231 |
| 5,262,868 | 11/1993 | Kaneko et al. | 348/233 |
| 5,274,457 | 12/1993 | Kobayashi et al. | 348/233 |
| 5,436,657 | 7/1995 | Fukuoka | 348/232 |
| 5,473,370 | 12/1995 | Moronaga et al. | 348/231 |
| 5,477,264 | 12/1995 | Sarbadhikari et al. | 348/233 |

FOREIGN PATENT DOCUMENTS 4-328966 11/1992 Japan .
6-253251 9/1994 Japan .

OTHER PUBLICATIONS

"Single–Hand Operated Camera–Recorder NV–SI", Morikawa et al., National Technical Report vol. 37, No. 3, pp. 5–12, Jun. 1991.

Primary Examiner—Sherrie Hsia
Attorney, Agent, or Firm—Antonelli, Terry, Stout & Kraus, LLP

[57] ABSTRACT

Image data photographed by a video camera 20 are compressed by a compression and decompression circuit 5, the compressed image data are recorded in an incorporated type semiconductor memory 6 or disk-type memory 13 fixed in the video camera 20 and the recorded image data are transferred to an external recording device 23. Further, the external recording device 23 records the transferred image data in a data storage while they are being compressed. The video camera 20 receives, decompresses and converts into a television signal the compressed image data read by the external recording device 23 in reproducing them. A video camera system capable of recording and reproducing long hours of image data by using a video camera having an ultra small size comparable to that of an 8 mm video cassette can be realized by using such a construction.

29 Claims, 13 Drawing Sheets

ULTRA SMALL VIDEO CAMERA AND A VIDEO CAMERA SYSTEM IN USE THEREOF

This application is a 37 CFR § 1.60 continuation of prior application Ser. No. 08/512,625, filed on Aug. 8, 1995; U.S. Pat. No. 5,646,684.

BACKGROUND OF THE INVENTION

The present invention relates to a video camera using a semiconductor memory or a disk-type memory as means for recording images and a video camera system for use thereof.

In a conventional video camera, as is described in National Technical Report Vol. 37 No. 3, June, 1991, pp. 263–272, a video tape recorder (VTR) is used as means for recording images taken by a video camera, wherein the camera and the VTR are accommodated in a single cabinet. The photographed images are recorded on a tape through the VTR accommodated in the cabinet, and long hours of image data can be recorded by periodically interchanging the VTR tape. However, in such a camera/VTR integrated camera, it is not possible in principle to provide a VTR portion having a size smaller than that of a cassette of the VTR tape, and, therefore, it has not been possible to realize a video camera capable of recording and reproducing images and having an ultra small size comparable to the size of the cassette.

Accordingly, it has been proposed to realize an ultra small video camera by compressing image data taken in by a camera and recording the date in a semiconductor memory without using a VTR, as in video cameras disclosed in Japanese Unexamined Patent Publication No. 253251/1994 and Japanese Unexamined Patent Publication No. 328966/1992. In the technology described here, a semiconductor memory is incorporated on an IC card which is attachable to and detachable from a main body of a video camera, such that a user can freely interchange semiconductor memories in the same manner as a VTR tape.

However, the IC card using a semiconductor memory is generally more expensive than a video tape and is not suitable for preserving a large amount of data generated over a long period of time. On the other hand, when dubbing is to be performed on a video tape by using a separate stationary VTR for preserving a large amount of image data, the time period required for the dubbing is equal to the time period for taking in images, which places an enormous burden on the user. Further, in this case, the image data recorded in digital form is converted back to data in analog form, which does not make good use of the digital recording.

Further, in the construction wherein the IC card is attachable and detachable, the probability of losing data due to static electricity, terminal failure, vibration or the like is enhanced, which significantly lowers its reliability. Meanwhile, in a construction wherein the attaching and of the memory are not possible due to use of a semiconductor memory in the main body of the video camera, only a relatively small amount of image data representing a limited period of time may be recorded.

SUMMARY OF THE INVENTION

It is an object of the present invention to realize a video camera capable of recording and reproducing images with its ultra small size comparable to that of a video cassette of 8 mm standard and a video camera system capable of recording image data over a period of many hours using such video camera.

To achieve the above-mentioned object, the video camera of the present invention includes image pickup elements for photoelectrically converting optical images to am electrical signal, a driving circuit for driving the image pickup elements, a signal processing circuit for forming predetermined dynamic image data by performing a predetermined signal processing on an output signal of the image pickup elements, a compression circuit for forming compressed image data by performing a predetermined data compression processing on the dynamic image data, a first memory fixed at an inner portion of the main body of the video camera for storing the compressed image data and a first digital signal outputting means for outputting the compressed image data read from the first memory to the outside of the main body of the video camera.

Further, a video camera system of the present invention includes the above-mentioned main body of the video camera and an external recording device which is attachably and detachably connected to the first digital signal outputting means of the main body of the video camera and which has a first digital signal inputting means to which the compressed image data is inputted and a second memory for storing the compressed image data inputted by the first digital signal inputting means and having a capacity which is larger than that of the first memory.

The memory incorporated in the main body of the video camera is used only for temporarily storing the compressed image data. The compressed image data is transferred to the external recording device via a cable, light or a public communications network by the digital signal outputting means after photographing has been finished. Accordingly, the preservation of a large amount of image data representing a long period of recording can be performed by the external memory and, therefore, the memory incorporated in the main body of the video camera can be made very small compared with that in a conventional VTR tape, as in a semiconductor memory or a disk-type memory. Further, if the memory is fixed such that it can not be detached from the main body of the video camera, the image data will not be destroyed by static electricity or the like. Further, the transferred data is compressed data and, therefore, the transferring time is very short and the image quality is not deteriorated since the data is in the form of digital signals. Further, it is possible to transfer the temporarily stored data to the external recording device in one's own house etc. by using a communications network and, therefore, it is not necessary to carry many a large number of tapes when traveling or the like. Further, image data recorded in a semiconductor memory or on a hard disk in the video camera can be preserved in an external recording device having a large storage capacity after photographing has been finished and, therefore, image data representing long hours of recording can be stored or reproduced.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

Figure 1:
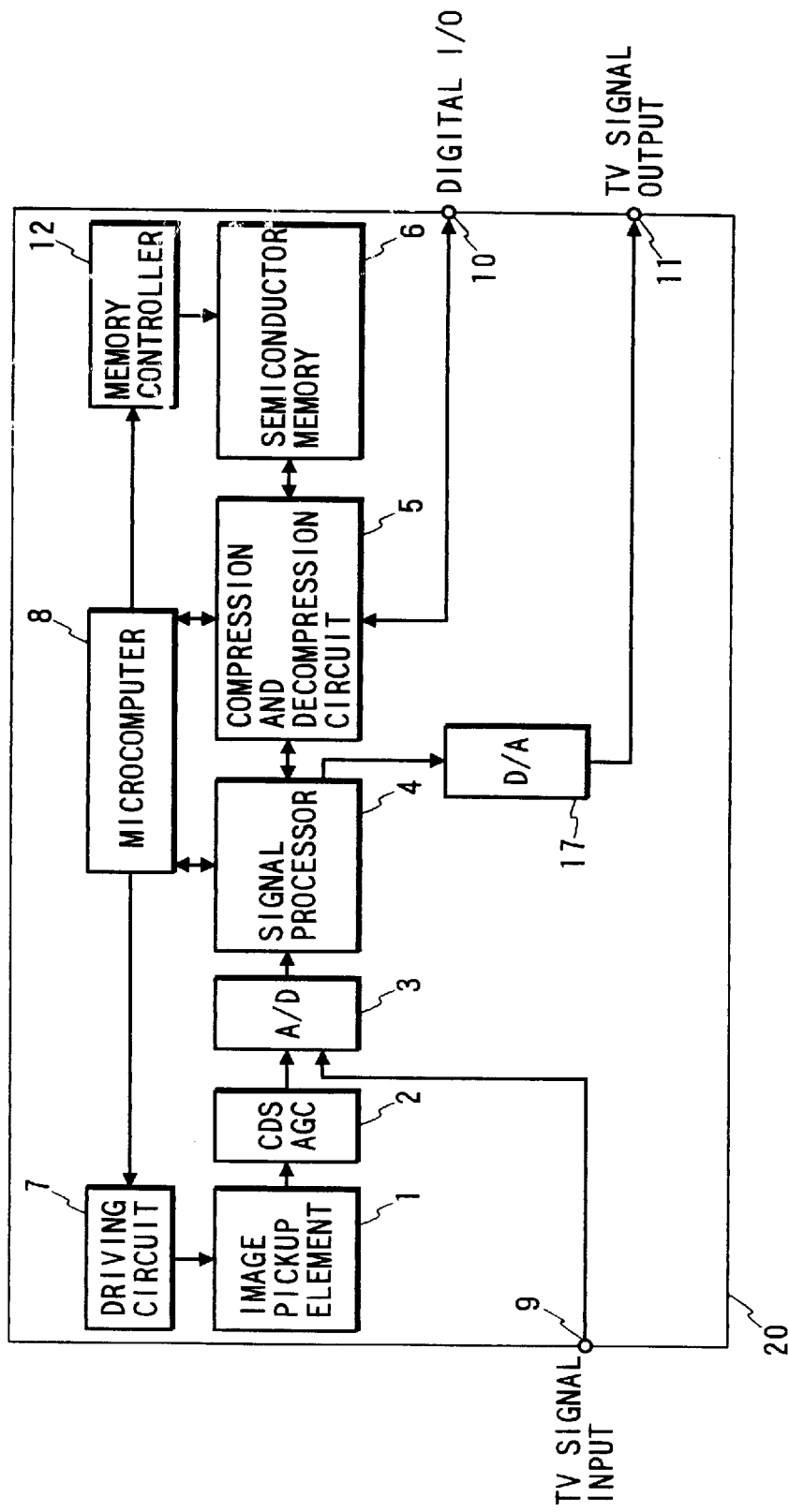
FIG. 1 is a block diagram showing an example of a video camera according to the present invention.

An explanation will be given of embodiments of the present invention with reference to the drawings as follows. FIG. 1 is a block diagram showing an embodiment of a video camera according to the present invention. The video camera 20 is constituted by image pickup elements 1, a CDS/AGC circuit 2, an A/D converter 3, a signal processing circuit 4, a compression and decompression circuit 5, a semiconductor memory 6, a driving circuit 7, a microcomputer 8, a TV signal input terminal 9, a digital I/O terminal 10, a TV signal output terminal 11, a memory controller 12 and a D/A converter 17.

An output terminal of the image pickup elements 1, driven by the driving circuit 7, is connected to an input terminal of the CDS/AGC circuit 2. An output terminal of the CDS/AGC circuit 2 is connected to one of two input terminals of the A/D converter 3. The TV signal input terminal 9 is connected to the other input terminal of the A/D converter 3. An output terminal of the A/D converter 3 is connected to an input terminal of the signal processing circuit 4. An output terminal of the signal processing circuit 4 is connected to an input terminal of the D/A converter 17. An output terminal of the D/A converter 17 is connected to the TV signal output terminal 11. Two input/output terminals of the signal processing circuit 4 are respectively connected to one of four input/output terminals of the compression and decompression circuit 5 and the microcomputer 8. The other input/output terminals of the compression and decompression circuit 5 are respectively connected to the digital I/O terminal 10, the microcomputer 8 and an input/output terminal of the semiconductor memory 6. The microcomputer 8 is connected to the driving circuit 7, the signal processing circuit 4, the compression and decompression circuit 5 and the memory controller 12. The microcomputer 8 controls the semiconductor memory 6 via the memory controller 12. Further, the semiconductor memory 6 is attached to the inside of the video camera 20 in a structure wherein a user cannot detach it therefrom freely which prevents the image data from being destroyed by static electricity.

With such a construction, when it is used in the camera mode, an image signal is formed by photoelectric conversion by the image pickup elements 1, a processing for reducing noise and a processing for making constant the signal level are carried out on the image signal by the CDS/AGC circuit 2 and the image is converted into a digital signal by the A/D converter 3. Further, when it is used in the line input mode, a composite image signal inputted via the TV signal input terminal 9 is converted into a digital signal by the A/D converter 3.

The digital signal outputted from the A/D converter 3 is supplied to the signal processing circuit 4. In the camera mode, the signal processing circuit 4 forms a luminance signal and a color-difference signal, modulates the color-difference signal with a color subcarrier and forms a composite image signal by mixing the modulated color signal with the luminance signal. Further, in the line input mode, the signal processing circuit 4 separates the digital signal into the luminance signal and a modulated color signal and demodulates the modulated color signal into a color-difference signal.

The composite image signal formed by the signal processing circuit 4 is converted into an analog signal by the D/A converter 17 and is outputted from the TV signal output terminal 11. Further, both of the color-difference signal and the luminance signal, formed by the signal processing circuit 4, are supplied to the compression and decompression circuit 5 and the data is compressed and recorded in the semiconductor memory 6 and also is outputted from the digital I/O terminal 10. In reading such image data from the semiconductor memory 6, the compressed color-difference signal and luminance signal from the semiconductor memory 6 are outputted to the digital I/O terminal 10 via the compression and decompression circuit 5. Further, the compressed image data is decompressed by the compression and decompression circuit 5 and supplied to the signal processing circuit 4. The signal processing circuit 4 forms a composite image signal by modulating the color-difference signal with a color subcarrier and by mixing it with the luminance signal. The composite image signal is converted into an analog signal by the D/A converter 17 and is outputted from the TV signal output terminal 11.

As stated above, in the case of this video camera, no VTR is used; rather a semiconductor memory is used as a recording means and therefore, the total device can, be very much downsized. Further, the image signal provided by the photographing is compressed and temporarily stored in the semiconductor memory and the recorded image data is outputted from the digital I/O terminal 10. Therefore, the image signal can be preserved by transferring it to an external recording device which is provided outside of the video camera 20. The image data is outputted from the digital I/O terminal as digital data and, therefore, no deterioration of image quality is caused even after dubbing. Further, an input terminal and an output terminal for an analog TV signal are provided and, therefore, the image signal recorded by an analog VTR or the like can be preserved in the external recording device by converting it into a digital signal and the digital data recorded in the semiconductor memory can be seen on a TV monitor. Further, in this video camera, the semiconductor memory is fixed within the structure in such away that the user cannot detach it therefrom freely and, therefore, the semiconductor memory can be prevented from being damaged or the data therein destroyed.

Figure 2:
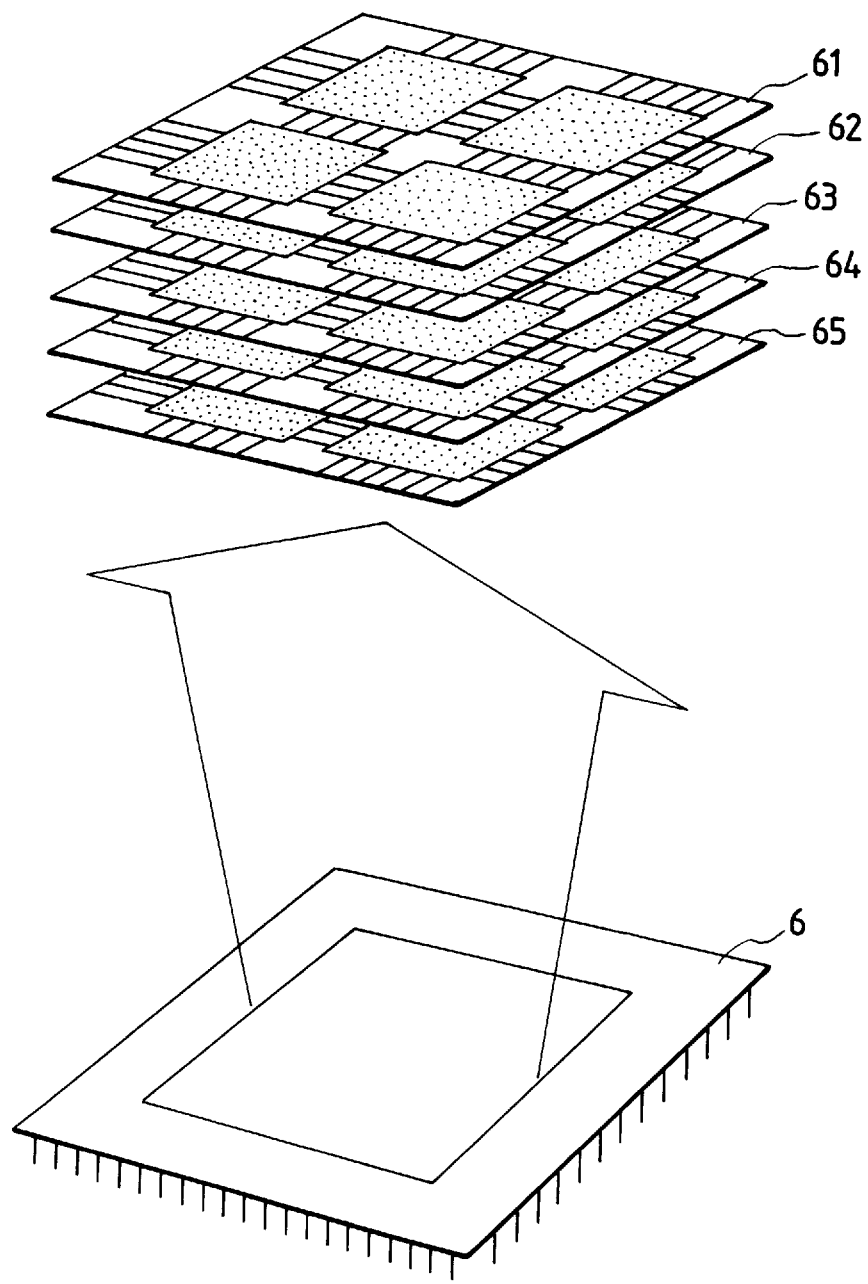
FIG. 2 is a view showing an example of a semiconductor memory for use in a video camera according to the present invention.

FIG. 2 is a view showing a specific example of the semiconductor memory 6 in FIG. 1. The semiconductor memory 6 is constituted by laminating a plurality of memory wafers 61 through 65. According to this structure, the memory capacity can be enhanced without increasing the size of the ICs of the semiconductor memory 6 and therefore, the amount of data temporarily stored in the semiconductor memory 6 can be increased without increasing the size of the video camera 20.

Figure 3:
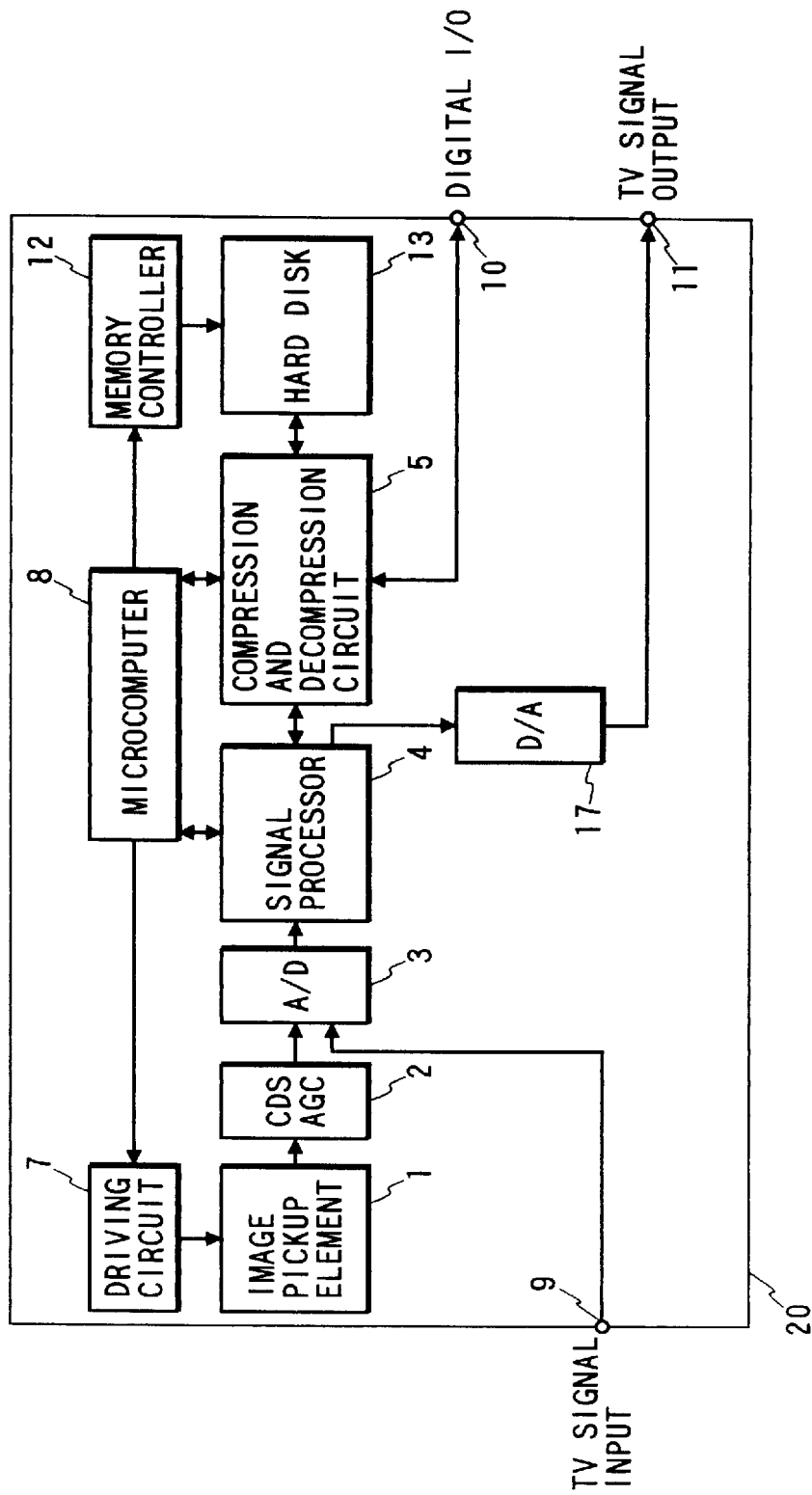
FIG. 3 is a block diagram showing another example of a video camera according to the present invention.

FIG. 3 is a block diagram showing another example of a video camera according to the present invention. Portions corresponding to those in FIG. 1 have been given the same reference numerals and a repeat of the explanation thereof will be omitted. The difference from the video camera in FIG. 1 lies in that a hard disk 13 is used in place of the semiconductor memory 6. Also, this hard disk 13 is attached to the video camera 20 in such a way that the user cannot detach it freely from the outside, which prevents destruction of the hard disk due to vibration accompanied by attaching and detaching it. A similar effect can be provided by this the video camera as in the video camera of FIG. 1. Further, the memory capacity of the hard disk is generally larger than that of the semiconductor memory 6 and therefore, the amount of the image data temporarily recorded in the video camera can be increased.

Figure 4:
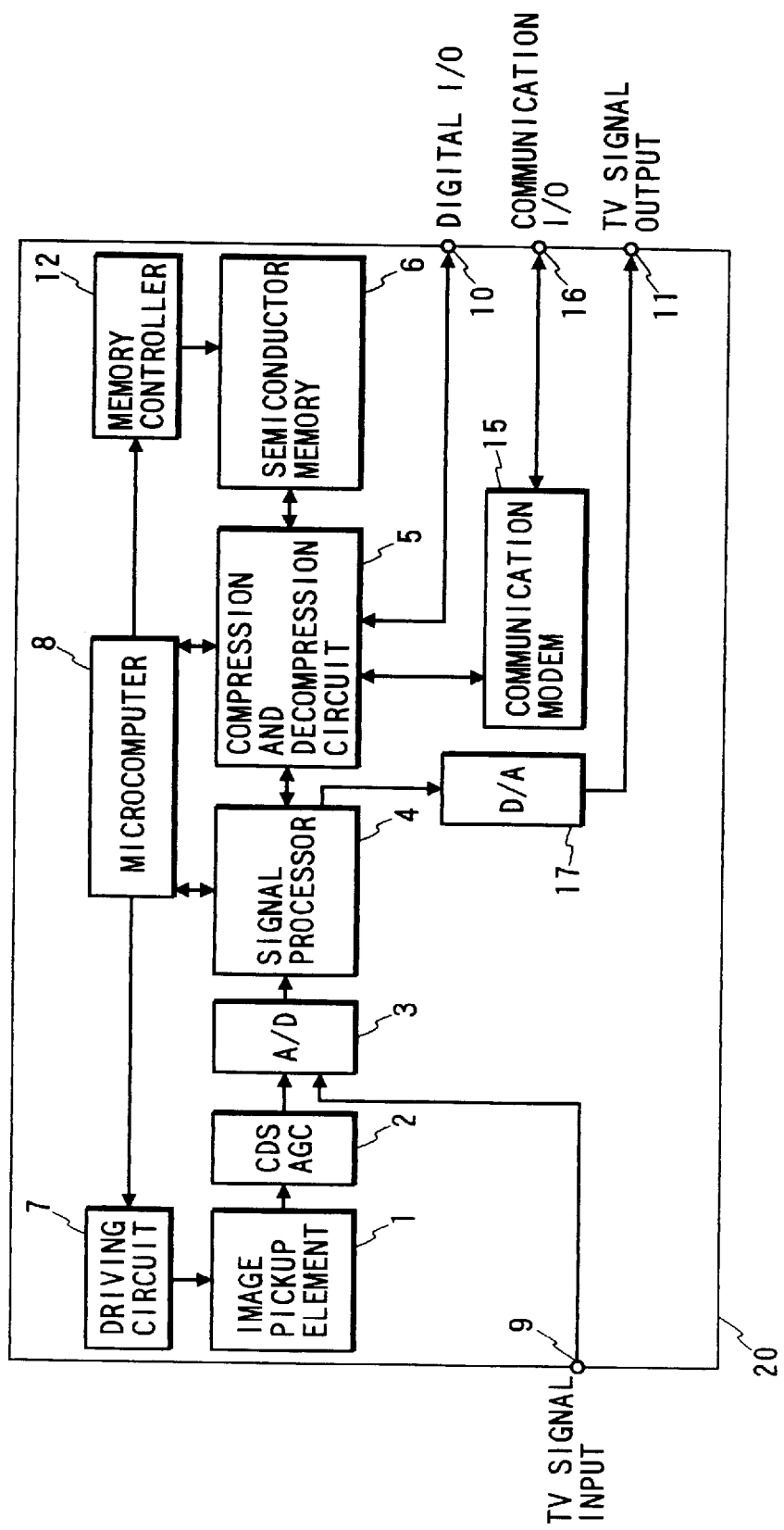
FIG. 4 is a block diagram showing another example of a video camera according to the present invention.

FIG. 4 is a block diagram showing another example of a video camera according to the present invention. Further, portions corresponding to those in FIG. 1 have been given the same reference numerals and a repeat of the explanation thereof will be omitted. The difference from the video camera of FIG. 1 lies in that a communication modem 15 and a communication I/O terminal 16 are additionally provided. One input/output terminal of the compression and decompression circuit 5 is connected to an input/output terminal of the communication modem 15 and the other input/output terminal of the communication modem 15 is attached to the communication I/O terminal 16. Thus, the communication I/O terminal 16 may be connected to a public communications network or the like. Meanwhile, a user may connect an external recording device, such as a VTR installed in his own house or the like, to the communications network. The image data compressed by the compression and decompression circuit 5, or the compressed image data supplied from the compression and decompression circuit 5 after being read from the semiconductor memory 6, is transferred to the external recording device through the communication modem 15 and the communication I/O terminal 16 via the public communications network. An effect similar to that obtained in the video camera in FIG. 1 can also be provided by this video camera and a user can take images for many hours without carrying an external recording device. Further, although the communication modem is incorporated in the video camera 20, it may be provided outside of the video camera 20. A similar effect can be obtained by installing the communication modem and the communication I/O terminal in the video camera in FIG. 3.

Figure 5:
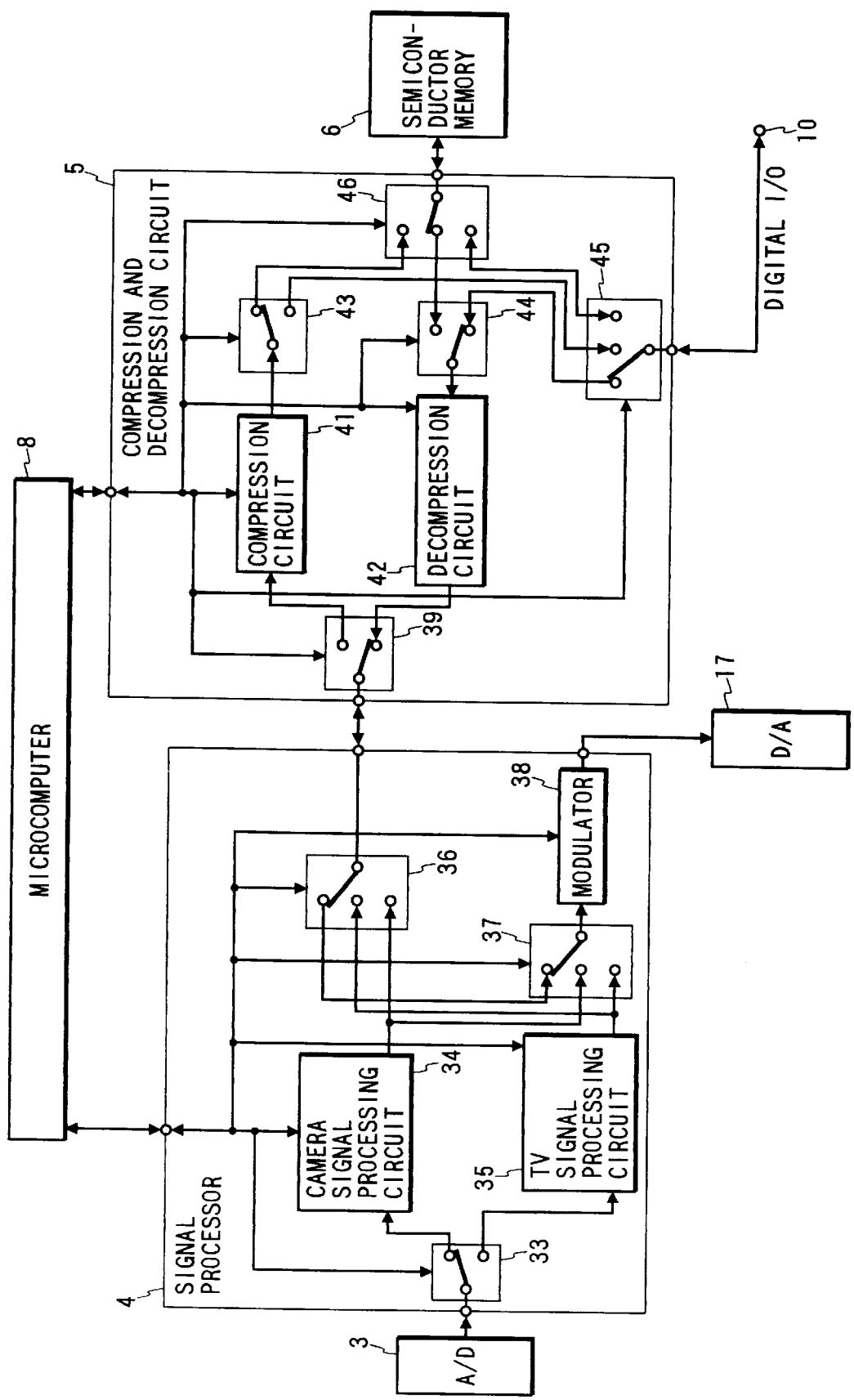
FIG. 5 is a block diagram showing an example of a signal processing circuit and a compression and decompression circuit for a video camera according to the present invention.

FIG. 5 shows a specific example of the signal processing circuit 4 and the data compression and decompression circuit 5 in each of the video cameras of FIG. 1, FIG. 3 and FIG. 4. The signal processing circuit 4 has a camera signal processing circuit 34 and a TV signal processing circuit 35, a modulator 38 and switches 33, 36 and 37. The compression and decompression circuit 5 has a compression circuit 41, a decompression circuit 42 and switches 39, 43, 44, 45 and 46. Data supplied to the compression and decompression circuit 5 via the digital I/O terminal 10 is supplied to the decompression circuit 42 via the switches 45 and 44. The output data from the decompression circuit 42 becomes the output data of the compression and decompression circuit 5 via the switch 39. The output data of the compression and decompression circuit 5 is inputted to the signal processing circuit 4. The inputted data is supplied to the modulator 38 via the switches 36 and 37. The output signal from the modulator 38 becomes the output signal of the signal processing circuit 4. The output signal from the signal processing circuit 4 is supplied to the D/A converter 17. The microcomputer 8 is connected to the switches 33, 36, 37, 39, 43, 44, 45 and 46, the camera signal processing circuit 34, the TV signal processing circuit 35, the modulator 38, the compression circuit 41 and the decompression circuit 42.

An explanation will be given of the operation as follows. The compressed image data inputted from the digital I/O terminal 10 is decompressed by the decompression circuit 42 in the compression and decompression circuit 5 and is outputted from the compression and decompression circuit 5. The image data outputted from the compression and decompression circuit 5 is inputted to the signal processing circuit 4, modulated by the modulator 38 and outputted from the signal processing circuit 4. The modulated image signal outputted from the signal processing circuit 4 is converted into an analog signal by the D/A converter 17. Further, the switches 33, 36, 37, 39, 43, 44, 45 and 46 are switched by the microcomputer to perform the above-mentioned operation. Although, although the semiconductor memory 6 is used in this embodiment as a memory incorporated in the video camera 20 for recording the image data, it may be replaced by the hard disk 13.

Figure 6:
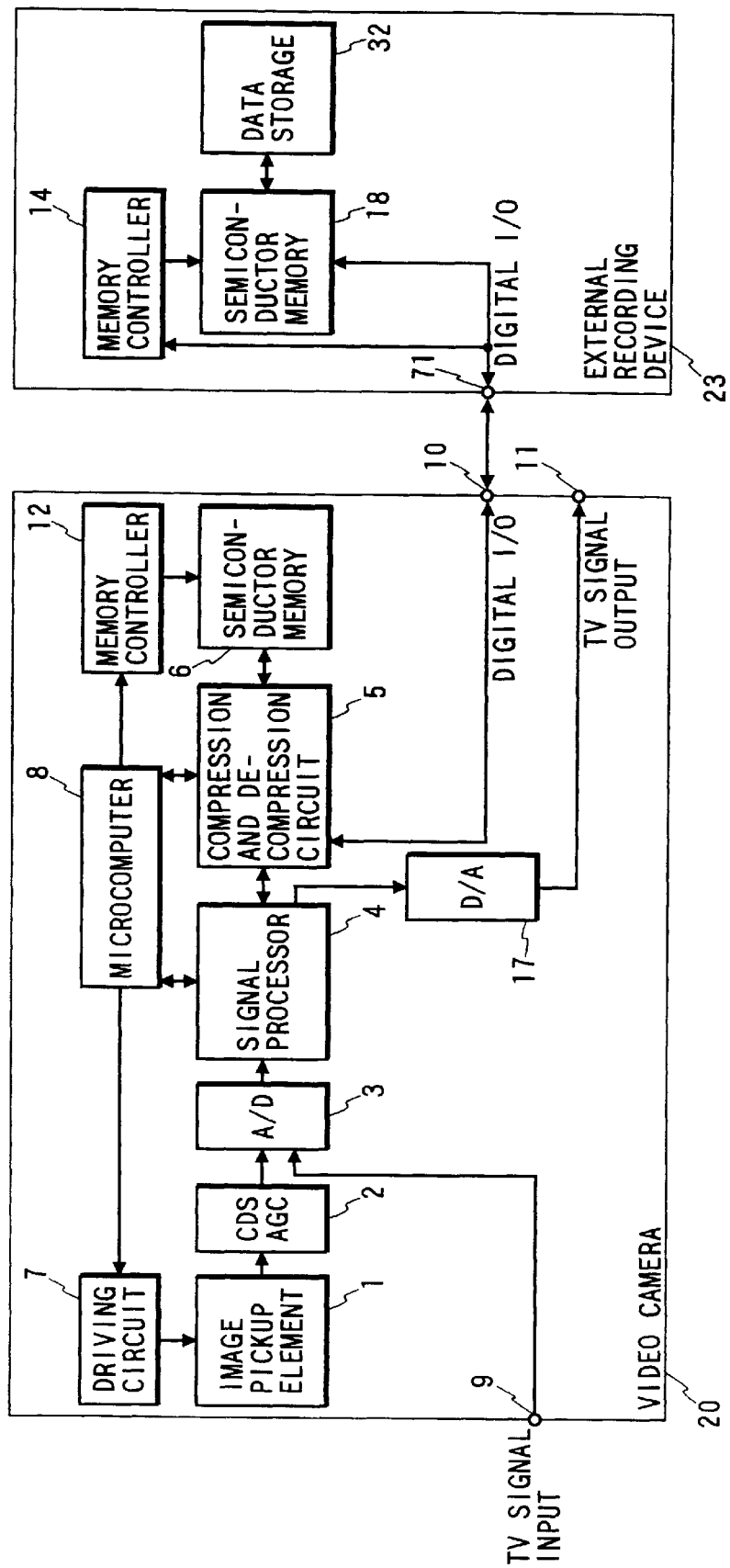
FIG. 6 is a block diagram showing an example of a video camera system according to the present invention.

FIG. 6 is a block diagram showing an example of a video camera system using the video camera of FIG. 1. Further, although the video camera of FIG. 1 is used here, either one of the video cameras of FIG. 3 and FIG. 4 may be used. An external recording device 23 is connected to the video camera 20 via the digital I/O terminal 10 and a digital I/O terminal 71. The digital I/O terminal 71 supplies data to a memory controller 14 and a semiconductor memory 18. The semiconductor memory 18 supplies data to the digital I/O terminal 71 and an attachable and detachable data storage 32. The memory controller 14 supplies control data to the semiconductor memory 18. The data storage 32 supplies data to the semiconductor memory 18.

An explanation will be given of the operation of transferring compressed image data recorded in the semiconductor memory 6 to the external recording device 23 in the video camera system of FIG. 6. The compressed image data recorded in the semiconductor memory 6 is transferred to the semiconductor memory 18 via the compression and decompression circuit 5, the digital I/O terminal 10 of the video camera 20 and the digital I/O terminal 71 of the external recording device 23. Since the compressed data is transferred through the compression and decompression circuit 5, the data is transferred while it is being compressed. The image data transferred first to the semiconductor memory 18 is further transferred to the attachable and detachable data storage 32.

Next, an explanation will be given of the operation of converting the compressed image data recorded in the external recording device 23 into TV signals by decompressing the data in the video camera system of FIG. 6. The compressed image data recorded in the attachable and detachable data storage 32 is supplied via the semiconductor memory 18, the digital I/O terminal 71 of the external recording device 23 and the digital I/O terminal 10 of the video camera 20 to the compression and decompression circuit 5 where it is decompressed. The decompressed data are converted into TV signals by the signal processing circuit 4, is further converted into analog TV signals by the D/A converter 17 and is outputted via the TV signal output terminal 11. The TV signals are displayed as images by being inputted to a TV monitor or the like.

According to this video camera system, the semiconductor memory 6, used as a recording means in the video camera 20, 6 has a capacity necessary for temporarily recording a significant amount of data and, therefore, an ultra small video camera can be realized. Further, the compressed image data can be transferred to the external recording device 23 after photographing. The compressed image data recorded in the external recording device 23 also can be inputted to the video camera 20, decompressed therein and outputted therefrom as TV signals when the content of the external recording device 23 is reproduced, with the result that many hours of image data can be recorded and reproduced. Further, the image data transferred between the video camera 20 and the external recording device 23 is compressed image data and, therefore, it can be transferred at a high speed. The recording means of the external recording device 23 is the attachable and detachable data storage 32 and, therefore, the amount of recordable image data is not restricted by interchanging the data storage 32. When the image data in the video camera 20 is transferred to the external recording device 23, the data is retransferred to the data storage 32 after being transferred first into the semiconductor memory 18 at a high speed and therefore, the video camera 20 is able to complete the transferring operation earlier than when the data is directly transferred to the data storage 32. Further, it is possible to record and reproduce TV signals inputted from the outside, to and from the external recording device 23.

Figure 7:
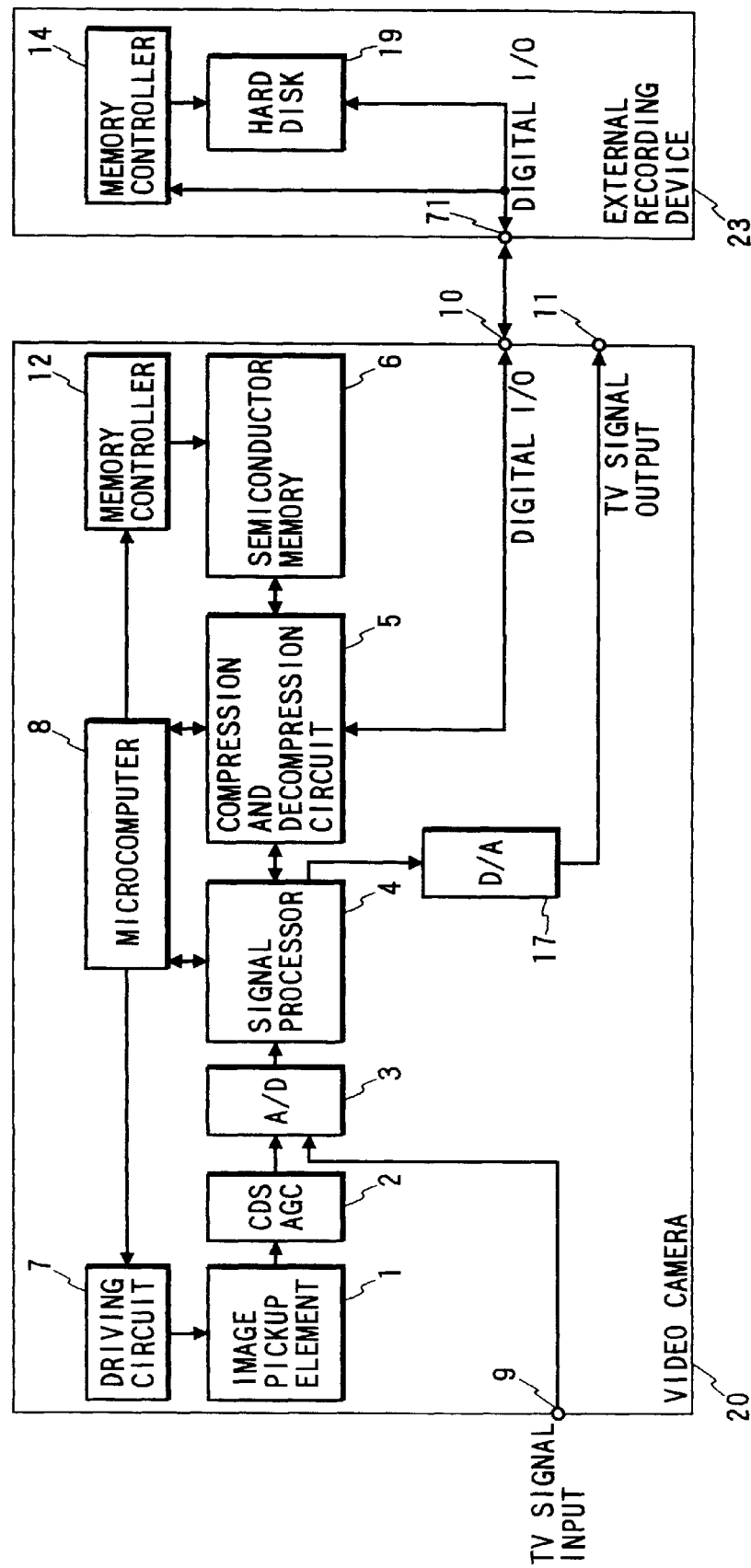
FIG. 7 is a block diagram showing another example of a video camera system according to the present invention.

FIG. 7 is a block diagram showing another example of a video camera system using the video camera of FIG. 1. In FIG. 7, the semiconductor memory 18 and the data storage 32 in the external recording device 23 in the system of FIG. 6 are replaced by a hard disk 19. This is used in a case where image data is recorded in a hard disk of a personal computer. An effect essentially similar to that in the system of FIG. 6 can be provided by this system.

Figure 8:
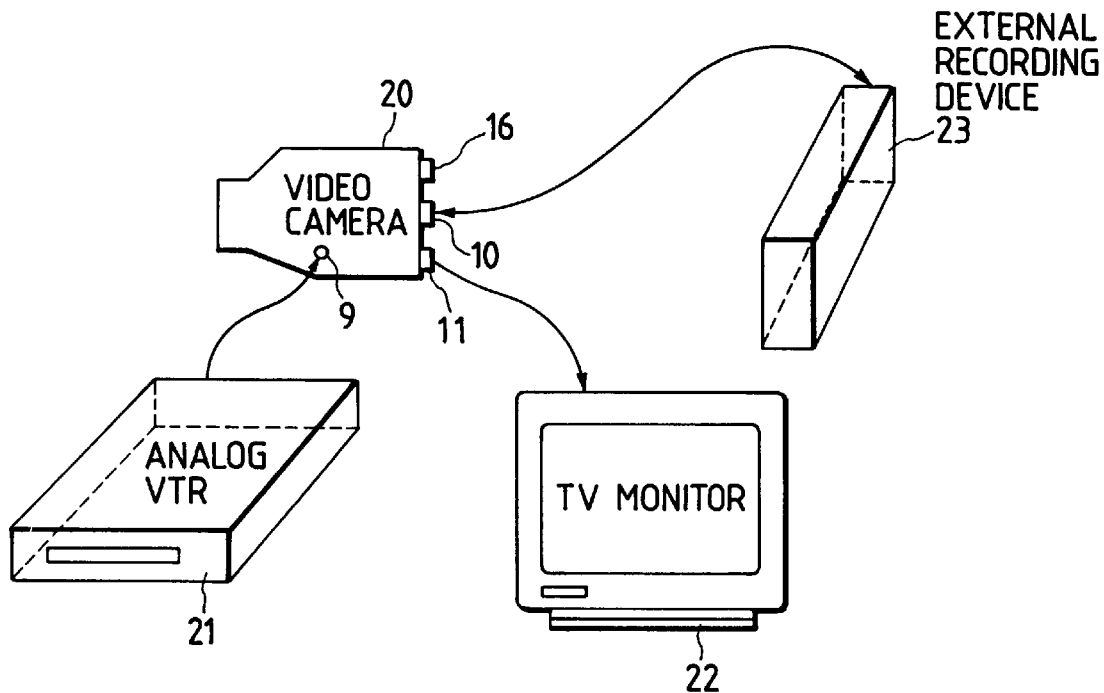
FIG. 8 is a diagrammatic view showing an example of connections among elements a video camera system according to the present invention.

FIG. 8 is a view showing an example of connections among various apparatuses in a video camera system of the present invention. Here, the external recording device 23, a TV monitor 22 and an analog VTR 21 are connected to the video camera 20. The TV signal input terminal 9 of the video camera 20 is connected to the analog VTR 21, the digital I/O terminal 10 of the video camera 20 is connected to the external recording device 23 and the TV signal output terminal 11 is connected to the TV monitor 22. The video camera 20 and the external recording device 23 used here may be any of the above-mentioned ones. However, the communication I/O terminal 16 in case of the video camera shown in FIG. 4 is not used here. It is possible to transfer the image data recorded in the memory (the semiconductor memory 6 or the hard disk 13) incorporated in the video camera 20 for temporarily recording it in the external recording device 23 or to monitor this data using the TV monitor 22 by connecting the respective apparatuses in such a way. It is also possible to dub the image data in the external recording device 23 through the process as mentioned above after reproducing the data using the analog VTR 21 and then inputting the data to the TV signal input terminal 9 of the video camera 20.

Figure 9:
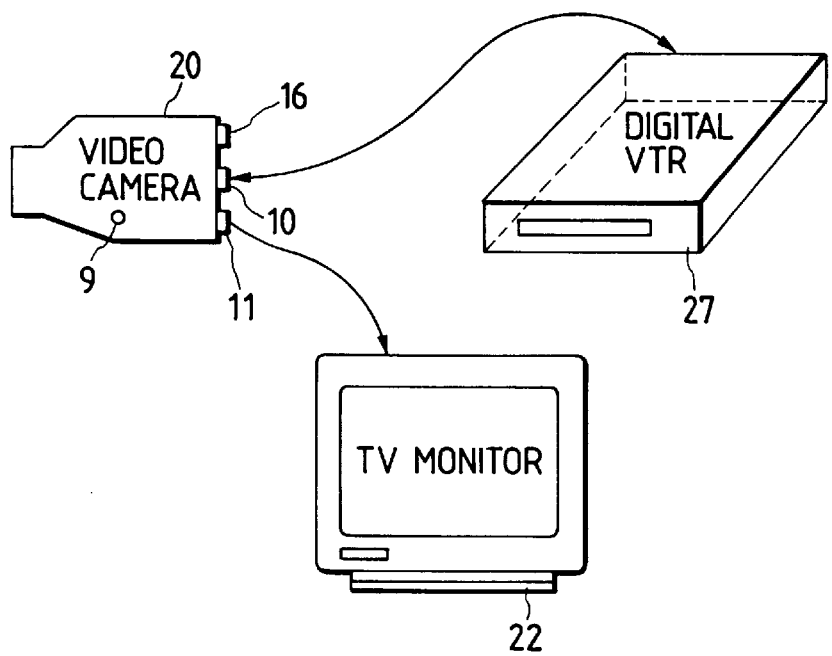
FIG. 9 is a diagrammatic view showing another example of a video camera system according to the present invention.

FIG. 9 is a view showing another example of connections among various apparatuses in a video camera system of the present invention. The video camera 20 is connected to the TV monitor 22 and a digital VTR 27. The video camera 20 may be any one of those shown in FIG. 1, FIG. 3 and FIG. 4. The digital I/O terminal 10 of the video camera 20 is connected to the digital VTR 27 and the TV signal output terminal 11 of the video camera 20 is connected to the TV monitor 22. It is possible to transfer the image data recorded in the memory (the semiconductor memory 6 or the hard disk 13) in the video camera 20 for temporarily recording it in the digital VTR 27 or to monitor the data using the TV monitor 22 by connecting the respective apparatuses in such a manner.

Figure 10:
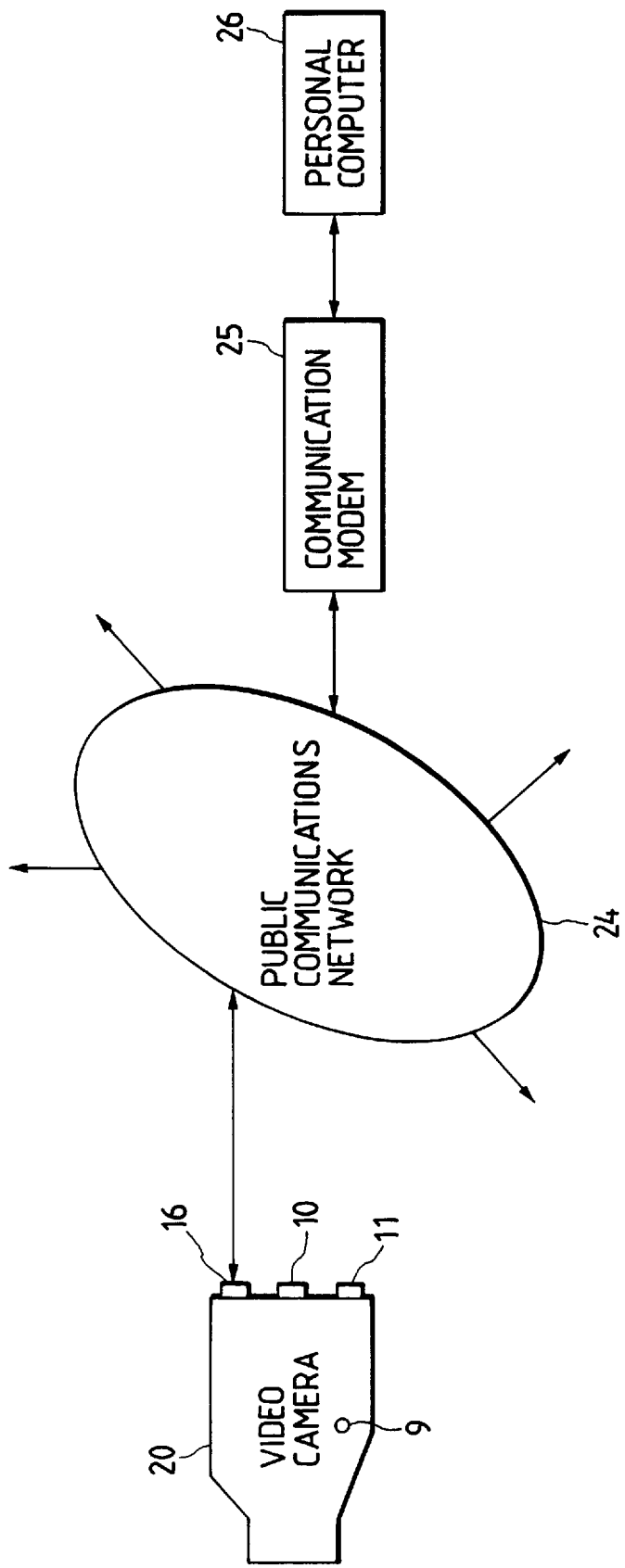
FIG. 10 is a diagrammatic view showing another example of a video camera system according to the present invention.

FIG. 10 is a view showing another example of connections among various apparatuses in a video camera system of the present invention. The video camera 20 is connected to a public communications network 24 and a communication modem 25 is connected to the communications network 24. A personal computer 26 is connected to the communication modem 25. Here, the video camera shown in FIG. 4 is used as the video camera 20. The communication I/O terminal 16 of the video camera 20 is connected to the communication modem 25 via the public communications network 24. Image data is sent to the personal computer 26 via the communication modem 25. In this way, the image data recorded in the memory (the semiconductor memory 6 or the hard disk 13) in the video camera 20 temporarily can be read and transferred from the communication I/O terminal 16 to the communication modem 25 via the public communications network 24 by connecting the respective apparatuses in such a manner. Accordingly, the image data can be stored in an internal memory of the personal computer 26 which is installed at locations different from that of the video camera 20.

Figure 11:
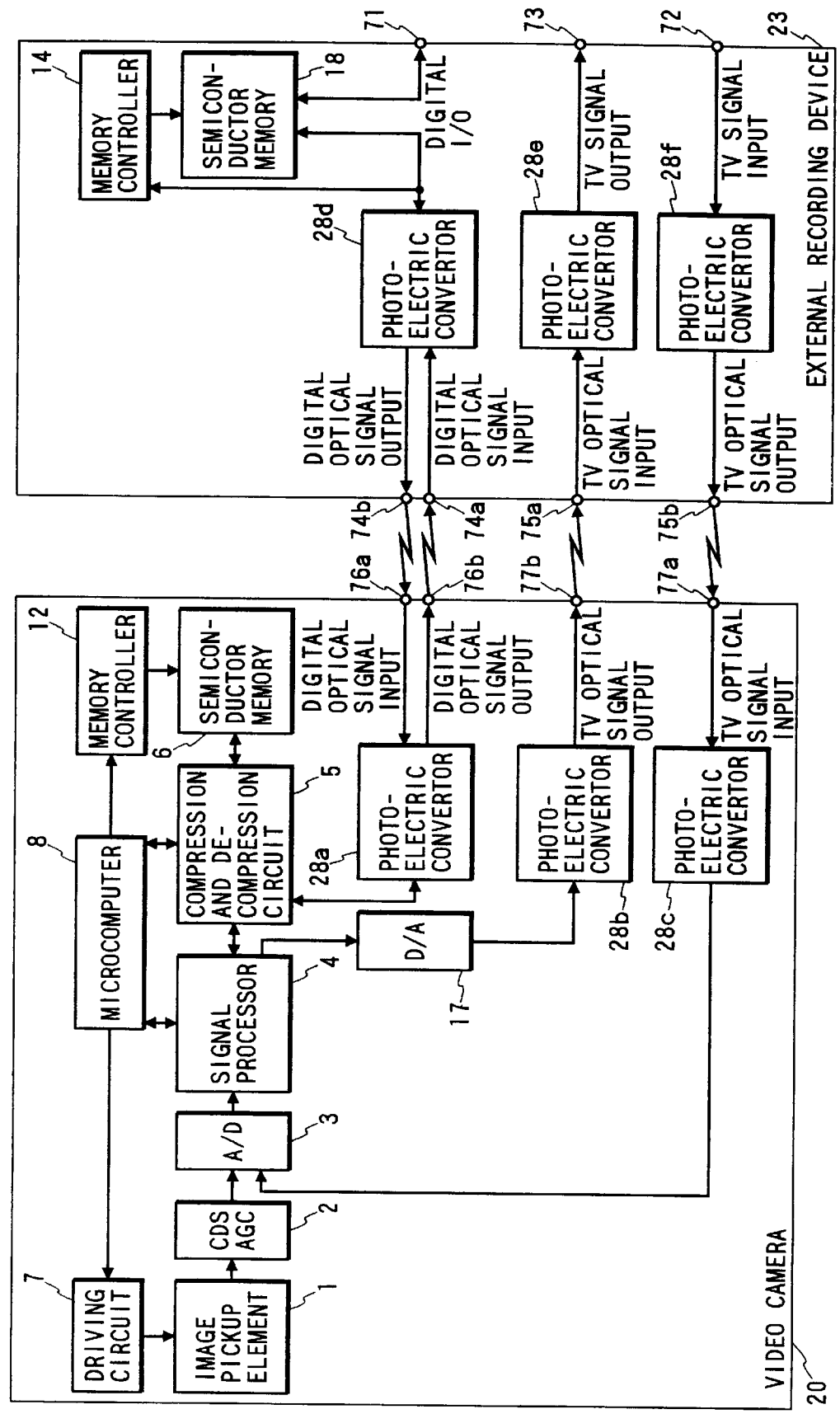
FIG. 11 is a block diagram showing another example of a video camera system according to the present invention.

FIG. 11 is a block diagram showing another example of a video camera system according to the present invention. This system is also constituted by the video camera 20 and the external recording device 23. The video camera 20 includes the image pickup elements 1, the CDS/AGC circuit 2, the A/D converter 3, the signal processing circuit 4, the compression and decompression circuit 5, the semiconductor memory 6, the driving circuit 7, the microcomputer 8, the memory controller 12, the D/A converter 17, photoelectric converters 28a, 28b and 28c, light emitting elements 76b and 77b and light receiving elements 76a and 77a. The external recording device 23 includes the semiconductor memory 18, the memory controller 14, photoelectric converters 28d, 28e and 28f, light emitting elements 74b and 75b, light receiving elements 74a and 75a, the digital I/O terminal 71, a TV signal input terminal 72 and a TV signal output terminal 73. The output signal of the image pickup elements 1 driven by the driving circuit 7 is supplied to the CDS/AGC circuit 2. An optical signal inputted from the light receiving element 77a is supplied to the photoelectric converter 28c. The output signal of the CDS/AGC circuit 2 and the output signal of the photoelectric converter 28c are supplied to the A/D converter 3. The output signal of the A/D converter 3 is supplied to the signal processing circuit 4. The output signals of the signal processing circuit 4 are supplied to the D/A converter 17, the microcomputer 8 and the compression and decompression circuit 5. The output signal of the D/A converter 17 is supplied to the photoelectric converter 28b. The output signal of the photoelectric converter 28b is supplied to the light emitting element 77b. The compression and decompression circuit 5 supplies data to the signal processing circuit 4, the semiconductor memory 6, the photoelectric converter 28a and the microcomputer 8. The photoelectric converter 28a supplies data to the compression and decompression circuit 5 and the light emitting element 76b. The light receiving element 76a supplies data to the photoelectric converter 28a. The microcomputer 8 supplies control data to the driving circuit 7, the signal processing circuit 4, the compression and decompression circuit 5 and the memory controller 12. The memory controller 12 supplies control data to the semiconductor memory 6. The light receiving element 76a of the video camera 20 is connected to the light emitting element 74b of the external recording device 23 through a light. The light path emitting element 76b of the video camera 20 is connected to the light receiving element 74a of the external recording device 23 through a light. The light path emitting element 77b of the video camera 20 is connected to the light receiving element 75a of the external recording device 23 through a light path. The light receiving element 77a of the video camera 20 is connected to the light emitting element 75b of the external recording device 23 through a light path. The light receiving element 74a and light emitting element 74b are connected to the photoelectric converter 28d. The photoelectric converter 28d supplies data to the memory controller 14 and the semiconductor memory 18. The semiconductor memory 18 supplies data to the photoelectric converter 28d and the digital I/O terminal 71. The memory controller 14 supplies control data to the semiconductor memory 18. The signal received from the light receiving element 75a is supplied to the photoelectric converter 28e. The output signal of the photoelectric converter 28e is supplied to the TV signal output terminal 73. The signal inputted from the TV signal input terminal 72 is supplied to the photoelectric converter 28f. The output signal of the photoelectric converter 28f is supplied to the light emitting element 75b.

Figure 12:
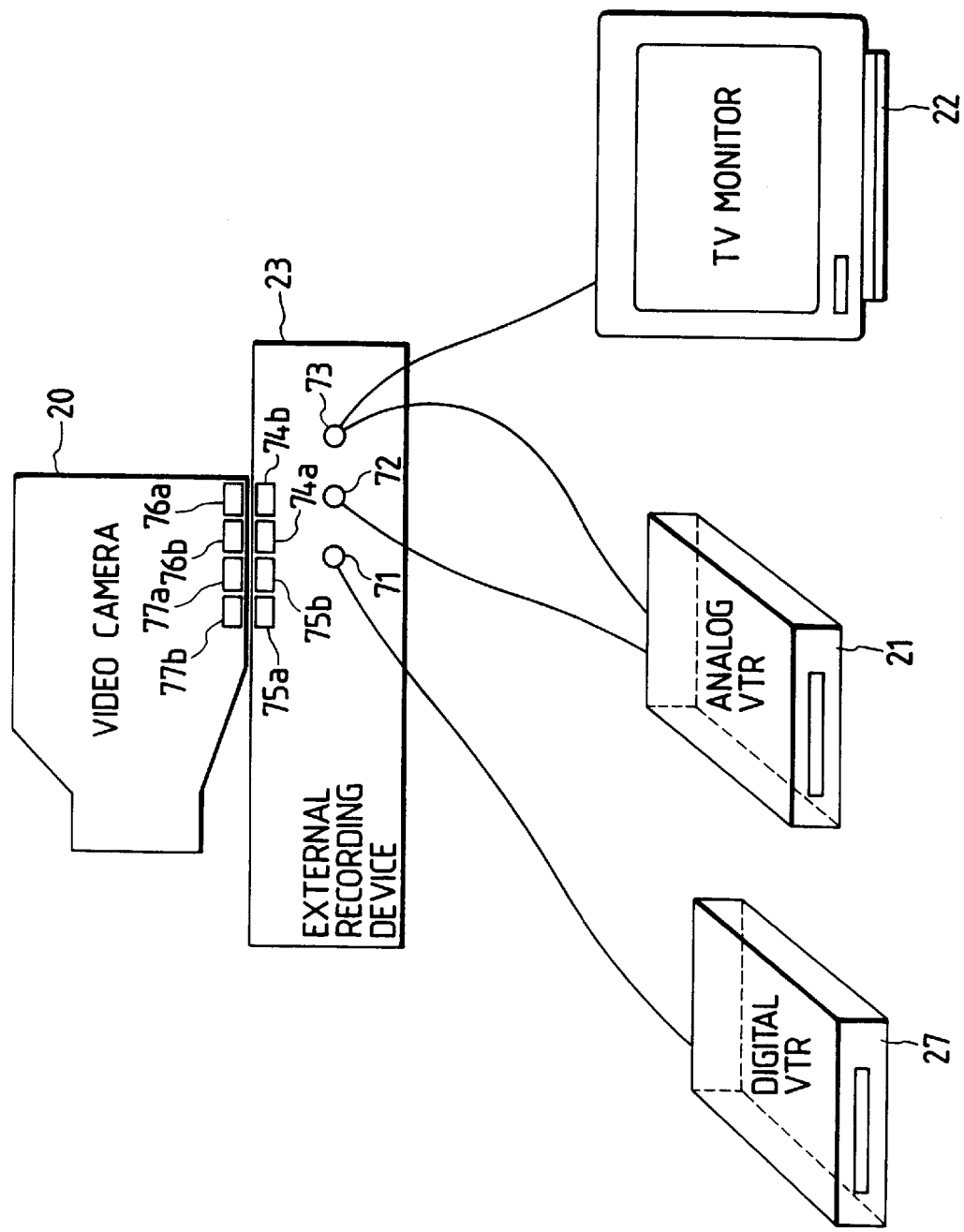
FIG. 12 is a diagrammatic view showing another example of a video camera system according to the present invention.

FIG. 12 shows an example of connections among respective component elements of the video camera system of FIG. 11. The light emitting element 77b of the video camera 20 is connected to the light receiving element 75a of the external recording device 23. The light receiving element 77a is connected to the light emitting element 75b of the external recording device 23. The light emitting element 76b of the video camera 20 is connected to the light receiving element 74a of the external recording device 23. The light receiving element 76a of the video camera 20 is connected to the light emitting element 74b of the external recording device 23. The digital I/O terminal 71 of the external recording device 23 is connected to the digital VTR 27. The TV signal output terminal 73 and the TV signal input terminal 72 of the external recording device 23 are connected to the analog VTR 21. The TV signal output terminal 73 of the external recording device 23 is also connected to the TV monitor 22. Further, the light emitting elements 76b and 77b and light receiving elements 76a and 77a of the video camera 20 are optically connected to the light receiving elements 74a and 75a and light emitting elements 74b and 75b of the external recording device 23, respectively, in a state wherein the video camera 20 is mounted at a predetermined location of the external recording device 23.

Next, an explanation will be given of the operation of the video camera shown in FIG. 11 and FIG. 12. The operation up to the step of recording the image data taken in by the video camera in the semiconductor memory 6 is similar to that of the example of the video camera of FIG. 1.

First, an explanation will be given of the operation up to the step of recording the TV signal inputted from the outside in the semiconductor memory 6 via the external recording device 23. The output signal of the analog VTR 21 is inputted from the TV signal input terminal 72 of the external recording device 23. The TV signal is photoelectrically converted in the external recording device 23 and inputted to the video camera 20 via the light emitting element 75b and the light receiving element 77a. The TV signal is photoelectrically converted in the video camera 20 and is further converted into a digital signal by the A/D converter 3. The image signal converted into the digital signal is subjected to TV signal processings' such as Y/C separation, modulation and the like, by the signal processing circuit 4. The image data formed by the TV signal processing is compressed by the compression and decompression circuit 5 and is recorded in the semiconductor memory 6.

Next, an explanation will be given of the operation up to the step of transferring the compressed image data recorded in the semiconductor memory 6 to the digital VTR 27 via the external recording device 23. The compressed image data recorded in the semiconductor memory 6 is inputted to the photoelectric converter 28a via the compression and decompression circuit 5 and is photoelectrically converted. The photoelectrically-converted compressed image data is inputted to the external recording device 23 via the light emitting element 76b and the light receiving element 74a. In this case, since the data is transferred via the compression and decompression circuit 5, the data is transferred while being compressed. The image data is photoelectrically converted by the photoelectric converter 28d and is transferred to the semiconductor memory 18 by the external recording device 23. The image data is first transferred to the semiconductor memory 18 and is then transferred to the digital VTR 27 via the I/O terminal 71.

Next, an explanation will be given of the operation up to the step of displaying the compressed image data recorded in the digital VTR 27 on the TV monitor 22 by decompressing the data and converting it into TV signals. The compressed image data recorded in the digital VTR 27 is photoelectrically converted after having been transferred to the digital I/O terminal 71 and the semiconductor memory 18 of the external recording device 23. The photoelectrically-converted image data is inputted to the video camera 20 via the light emitting element 74b and the light receiving element 76a. The image data inputted to the video camera 20 is again photoelectrically converted, decompressed by the compression and decompression circuit 5, converted into TV signals by the signal processing circuit 4, converted into analog signals by the D/A converter 17 and then photoelectrically-converted. The photoelectrically-converted signal is inputted to the external recording device 23, inputted to the TV monitor 22 via the light emitting element 77b, the light receiving element 75a and the TV signal output terminal 73 by the external recording device 23, and is displayed as images.

This video camera also provides an effect similar to that in FIG. 6. Further, the external recording device 23 becomes a station of a video camera 20. That is, the video camera 20 and the external recording device 23 are connected by the light emitting elements 76b and 74b and the light receiving elements 74a and 76a and paths of the TV signals are connected by the light receiving elements 75a and 77a and the light emitting elements 77b and 75b. The inputting and the outputting of the TV signals are performed by the TV signal input terminal 72 and the TV signal output terminal 73 of the external recording device 23. Therefore, when the analog VTR 21 is connected to the TV signal input terminal 72 and the TV signal output terminal 73, the TV monitor 22 is connected to the TV signal output terminal 73 and the digital VTR 27 is connected to the digital I/O terminal 71, in a case where the transfer of data is performed among the VTRs 21 and 27 or the TV monitor 22 and the video camera 20, the transfer can be preformed merely by disposing the video camera 20 on the external recording device 23 which dispenses with the need for troublesome connecting cables. Further, in a case where the total of the video camera 20 is contained in a water-proof package for using it in water or the like and the terminals cannot be disposed at the outside, the transfer of the data can be performed by light connection. Further, although the transfer of data is performed by the light connection between the video camera 20 and the external recording device 23 in this example, it is more inexpensive to connect them by metallic terminals without using photoelectric converters, light receiving elements and light emitting elements.

Figure 13:
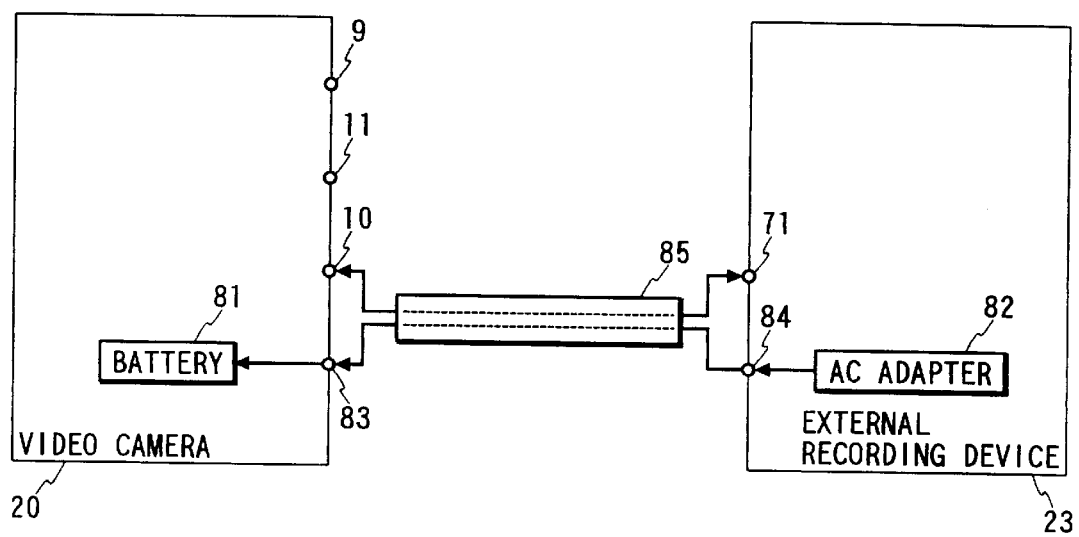
FIG. 13 is a diagram showing another example of a video camera system according to the present invention.

FIG. 13 is a block diagram showing another example of a video camera system according to the present invention. A battery 81 for the video camera 20 is connected to an AC adapter 82 incorporated in the external recording device 23 via an input terminal 83 for charging, an output terminal 84 for charging and a comon cable 85. Digital image data is transferred and power is supplied from the AC adaptor to the battery via the common cable 85. The cable 85 transfers digital image data between the video camera 20 and the external recording device 23 via the digital I/O terminals 10 and 71 and a DC power generated by an AC power source at the AC adapter 82 is supplied to the battery 81 via the output terminal 84 for charging, the cable 85 and the input terminal 83 for charging. While the image data is transferred between the video camera 20 and the external recording device 23, the battery 81 can be charged by the AC adapter 82 via the cable 85. Therefore, even when the remaining amount in power of the battery 81 in the video camera 20 is decreased during the data transferring operation, the battery can simply be charged simultaneously with the data transferring operation.

Figure 14:
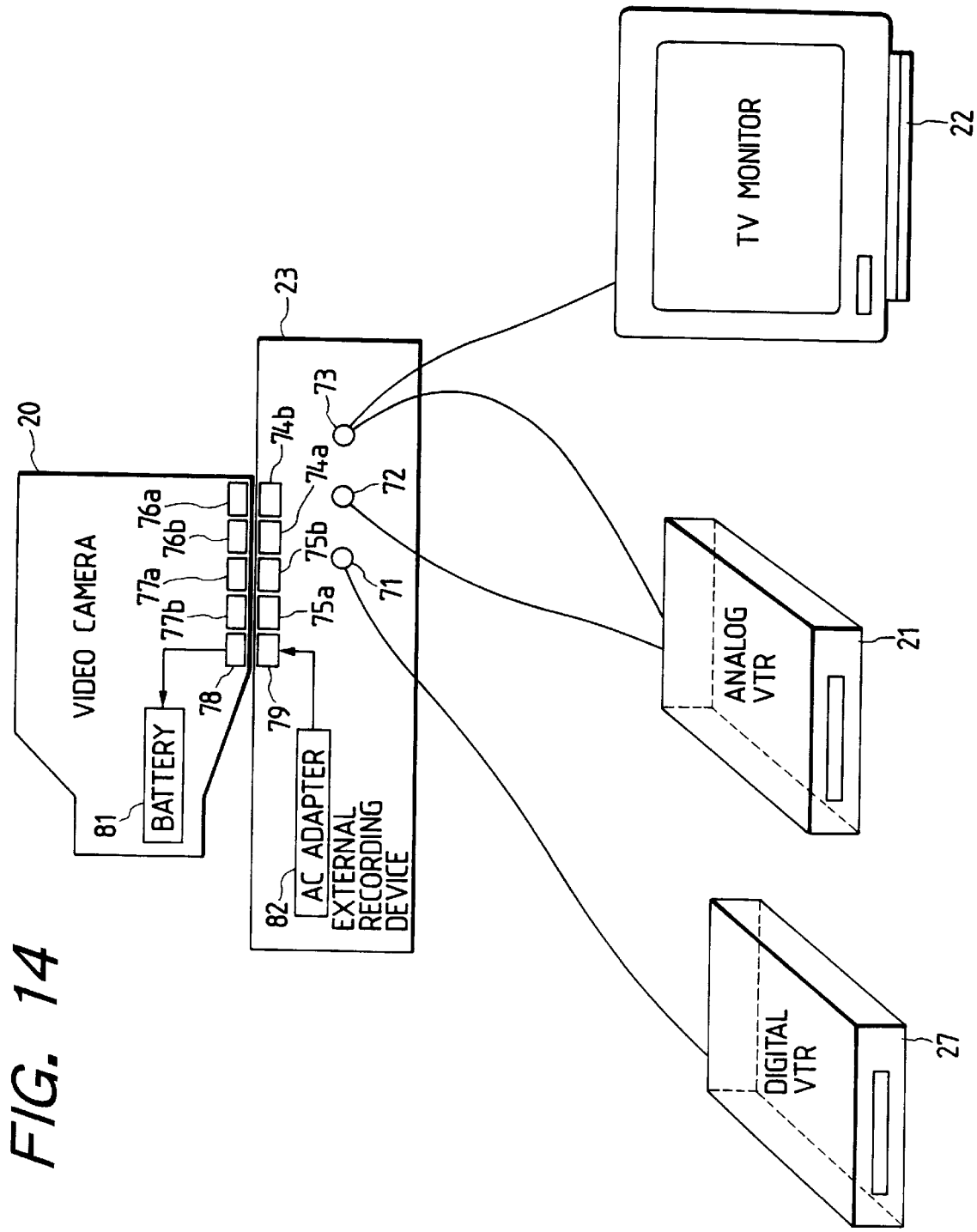
FIG. 14 is a diagrammatic view showing another example of a video camera system according to the present invention.

FIG. 14 is a view showing another example of a video camera system according to the present invention. As in the system of FIG. 13, the battery 81 in the video camera 20 is connected to the AC adapter 82 incorporated in the external recording device 23 by an input terminal 78 for charging and an output terminal 79 for charging. The image data is transferred between the video camera 20a and the external recording device 23 through a light connection. Further, the DC power generated by the AC power source at the AC adapter 82 is supplied to the battery 81 via the output terminal 79 for charging and the input terminal 78 for charging. The output terminal 79 for charging and the input terminal 78 for charging may be of a contact type using metallic terminals or of a non-contact type utilizing electromagnetic induction or the like. Also, in this system as in the system of FIG. 12, the external recording device 23 is a station of the video camera 20 and, therefore, when data is transferred among the VTRs 21 and 27 and the TV monitor 22 and the video camera 20, the video camera 20 need only be mounted on a predetermined location of the external recording device 23. Accordingly, there is no need for troublesome connecting cables in transferring data, and the video camera 20 can be charged simultaneously with the transferring of data as in the system of FIG. 12. Further, as in the system of FIG. 12, although data is transferred between the video camera 20 and the external recording device 23 by light connection, the connection may be performed by metallic terminals without using photoelectric converters, light receiving elements and light emitting elements.

We claim:

1. A video camera forming an image by photoelectric conversion from an optical image focused thereon, comprising:
   a compression circuit which generates compressed image data by processing image data of the image with a predetermined data compression processing;
   a randomly accessible storage device which stores the compressed image data; and
   a communication circuit which converts the compressed image data into a digital signal having a predetermined communication format and outputs the digital signal to an outside of a video camera body, the compressed image data being selectively inputted from the compression circuit and the storage device.

2. A video camera according to claim 1, wherein the storage device is provided inside of the main body of the video camera so as to be non-removable.

3. A video camera according to claim 1, wherein the storage device is a semiconductor memory.

4. A video camera according to claim 3, wherein said semiconductor memory has a structure in which a plurality of memory wafers are laminated.

5. A video camera according to claim 1, wherein the storage device is a disk-type device.

6. A video camera according to claim 1, further comprising:
   a decompression circuit which decompresses the compressed image data received from the communication circuit or the storage device;
   a television signal processing circuit which converts decompressed image data into television signals; and
   a television signal outputting unit which outputs the television signals to the outside.

7. A video camera according to claim 1, further comprising:
   a television signal input unit which inputs television signals from the outside; and
   a television signal processing circuit which converts the television signals inputted from the television signal input unit into the image data; and
   wherein the compression circuit performs a data compression processing on the image data converted by the television signal processing circuit to thereby form the compressed image data.

8. A video camera forming an image by photoelectric conversion from an optical image focused thereon, comprising:
   a compression circuit which generates compressed an image data by processing an image data converted from the optical image with a predetermined data compression processing;
   a controller which controls the compressed an image data to store and read out the compressed an image data in a randomly accessible storage device; and
   a communication circuit which converts the compressed an image data selectively inputted from the compression circuit and the storage device into a digital signal having a predetermined communication format and outputs the digital signal to an outside of a main body of the video camera.

9. A video camera according to claim 8, wherein the storage device is formed inside of the main body of the video camera so as to be non-removable.

10. A video camera according to claim 8, wherein the storage device is a semiconductor memory.

11. A video camera according to claim 10, wherein said semiconductor memory has a structure in which a plurality of memory wafers are laminated.

12. A video camera according to claim 8, wherein the storage device comprises a disk type memory medium and a hard disk drive.

13. A video camera according to claim 8, further comprising:
   a decompression circuit which decompresses the compressed image data received from the communication circuit or the storage device;

a television signal processing circuit which converts decompressed image data into television signals; and a television signal outputting unit which outputs the television signals to the outside.

14. A video camera according to claims 8, further comprising;

a television signal input unit which inputs television signals from the outside; and a television signal processing circuit which converts the television signals inputted from the television signal input unit into the image data; and wherein the compression circuit performs a data compression processing on the image data converted by the television signal processing circuit to thereby form the compressed image data.

15. A video camera comprising:

image pickup elements for photoelectrically converting an optical image;

a driving circuit for driving the image pickup elements;

a signal processing circuit for forming predetermined image data by performing a predetermined signal processing on an output signal of the image pickup elements;

a compression circuit for forming compressed image data by performing a predetermined data compression processing on the predetermined image data;

a memory for storing the compressed image data;

a digital signal outputting means for outputting the compressed image data read from the memory to the outside of a main body of the video camera; and a television signal inputting means for inputting television signals from the outside and a television signal processing circuit for converting the television signals inputted from the television signal inputting means into image data; and wherein the compression circuit performs a data compression processing on the image data converted by the television signal processing circuit to thereby form compressed image data.

16. A video camera comprising:

image pickup elements for photoelectrically converting an optical image;

a driving circuit for driving the image pickup elements;

a signal processing circuit for forming predetermined image data by performing a predetermined signal processing on an output signal of the image pickup elements;

a compression circuit for forming compressed image data by performing a predetermined data compression processing on the predetermined image data;

a memory for storing the compressed image data;

a digital signal outputting means for outputting the compressed image data read from the memory to the outside of a main body of the video camera; and a communication circuit for sending the compressed image data read from the memory to an outside communications network.

17. A video camera system comprising:

(a) a main body of a video camera including:
  (1) image pickup elements for photoelectrically converting an optical image;
  (2) a driving circuit for driving the image pickup elements;
  (3) a signal processing circuit for forming predetermined image data by performing a predetermined signal processing on an output signal of the image pickup elements;
  (4) a compression circuit for forming compressed image data by performing a predetermined data compression processing on the predetermined image data;
  (5) a first memory for storing the compressed image data; and
  (6) a first digital signal outputting means for outputting the compressed image data read from the first memory to the outside of the main body of the video camera; and (b) an external recording device including:
  (1) a first digital signal inputting means attachably and detachably connected to the first digital signal outputting means of the main body of the video camera for inputting the compressed image data; and
  (2) a second memory for storing the compressed image data inputted by the first digital signal inputting means, said second memory having a capacity larger than a capacity of the first memory;

wherein the first digital signal outputting means is a first light emitting element for converting an electric signal representing the compressed image data into a light signal and outputting the light signal to the outside of the main body of the video camera, and the first digital signal inputting means is a first light receiving element for converting the light signal received from the first light emitting element into an electric signal.

18. A video camera system according to claim 17, wherein the external recording device further includes a second digital signal outputting means for outputting the compressed image data read from the second memory, and the main body of the video camera further includes a second digital signal inputting means attachably and detachably connected to the second digital signal outputting means of the external recording device for inputting the compressed image data, a decompression circuit for decompressing the compressed image data inputted by the second digital signal inputting means, a television signal processing circuit for converting image data decompressed by the decompression circuit into a television signal and a television signal outputting means for outputting the television signal to the outside of the main body of the video camera.

19. A video camera system according to claim 18, wherein the first digital signal outputting means and the second digital signal inputting means constitute a first digital signal inputting and outputting terminal for transferring data in both input and output directions, and the first digital signal inputting means and the second digital signal outputting means constitute a second digital signal inputting and outputting terminal attachably and detachably connected to the first digital signal inputting and outputting terminal.

20. A video camera system according to claim 18, wherein the second digital signal outputting means is a second light emitting element for converting an electric signal representing the compressed image data into a light signal and outputting the light signal to the outside of the external recording device, and the second digital signal inputting means is a second light receiving element for converting the light signal from the second light emitting element again into an electric signal.

21. A video camera system according to claim 20, wherein the television signal outputting means is a third light emitting element for converting the television signal into a light signal and outputting the light signal to the outside of the main body of the video camera, and the external recording device further includes a third light receiving element for converting the light signal from the third light emitting element again into an electric signal and a television signal output terminal for outputting the television signal from the third light receiving element to the outside of the external recording device.

22. A video camera system comprising:
(a) a main body of a video camera including:
 (1) image pickup elements for photoelectrically converting an optical image;
 (2) a driving circuit for driving the image pickup elements;
 (3) a signal processing circuit for forming predetermined image data by performing a predetermined signal processing on an output signal of the image pickup elements;
 (4) a compression circuit for forming compressed image data by performing a predetermined data compression processing on the predetermined image data;
 (5) a first memory for storing the compressed image data; and
 (6) a first digital signal outputting means for outputting the compressed image data read from the first memory to the outside of the main body of the video camera; and
(b) an external recording device including:
 (1) a first digital signal inputting means attachably and detachably connected to the first digital signal outputting means of the main body of the video camera for inputting the compressed image data; and
 (2) a second memory for storing the compressed image data inputted by the first digital signal inputting means, said second memory having a capacity larger than a capacity of the first memory;
wherein the main body of the video camera further includes a television signal inputting means for inputting television signals from the outside of the main body of the video camera and a television signal processing circuit for forming image data by performing a predetermined signal processing on the television signals.

23. A video camera system comprising:
(a) a main body of a video camera including:
 (1) image pickup elements for photoelectrically converting an optical image;
 (2) a driving circuit for driving the image pickup elements;
 (3) a signal processing circuit for forming predetermined image data by performing a predetermined signal processing on an output signal of the image pickup elements;
 (4) a compression circuit for forming compressed image data by performing a predetermined data compression processing on the predetermined image data;
 (5) a first memory for storing the compressed image data; and
 (6) a first digital signal outputting means for outputting the compressed image data read from the first memory to the outside of the main body of the video camera; and
(b) an external recording device including:
 (1) a first digital signal inputting means attachably and detachably connected to the first digital signal outputting means of the main body of the video camera for inputting the compressed image data; and
 (2) a second memory for storing the compressed image data inputted by the first digital signal inputting means, said second memory having a capacity larger than a capacity of the first memory;
wherein the first digital signal outputting means is connected to the first digital signal inputting means by mounting the main body of the video camera at a predetermined location with respect to the external recording device and using light communication means to effect communication therebetween.

24. A video camera system comprising:
(a) a main body of a video camera including:
 (1) image pickup elements for photoelectrically converting an optical image;
 (2) a driving circuit for driving the image pickup elements;
 (3) a signal processing circuit for forming predetermined image data by performing a predetermined signal processing on an output signal of the image pickup elements;
 (4) a compression circuit for forming compressed image data by performing a predetermined data compression processing on the predetermined image data;
 (5) a first memory for storing the compressed image data; and
 (6) a first digital signal outputting means for outputting the compressed image data read from the first memory to the outside of the main body of the video camera; and
(b) an external recording device including:
 (1) a first digital signal inputting means attachably and detachably connected to the first digital signal outputting means of the main body of the video camera for inputting the compressed image data; and
 (2) a second memory for storing the compressed image data inputted by the first digital signal inputting means, said second memory having a capacity larger than a capacity of the first memory;
wherein the external recording device further includes an AC adapter for forming a direct current power source from an alternating current power source and a power source output terminal for outputting direct current from the direct current power source, and the main body of the video camera further includes a power source input terminal for inputting the direct current from the power source output terminal and a battery capable of being charged by being supplied with the direct current inputted via the power source input terminal; and
wherein the battery is charged while the compressed image data is being transferred from the first digital signal outputting means to the first digital signal inputting means.

25. A video camera system according to claim 24, wherein the first digital signal outputting means is connected to the first digital signal inputting means and the power source output terminal is connected to the power source input terminal by mounting the main body of the video camera at a predetermined location with respect to the external recording device.

26. A video camera system comprising:
(a) a main body of a video camera including:
 (1) image pickup elements for photoelectrically converting an optical image;

(2) a driving circuit for driving the image pickup elements;
(3) a signal processing circuit for forming predetermined image data by performing a predetermined signal processing on an output signal of the image pickup elements;
(4) a compression circuit for forming compressed image data by performing a predetermined data compression processing on the predetermined image data;
(5) a first memory for storing the compressed image data;
(6) a first digital signal inputting and outputting means for outputting the compressed image data read from the first memory to an outside of the main body of the video camera and for inputting the compressed image data from the outside thereof;
(7) a decompression circuit for forming image data by performing a decompression processing on the compressed image data inputted by the first digital signal inputting and outputting means;
(8) a television signal processing circuit for forming a television signal by performing a predetermined signal processing on the image data received from the decompression circuit; and
(9) a television signal outputting means for outputting the television signal to the outside of the main body of the video camera; and
(b) an external recording device including:
(1) a second digital signal inputting and outputting means attachably and detachably connected to the first digital signal inputting and outputting means of the main body of the video camera for inputting the compressed image data from the main body of the video camera and for outputting the compressed image data to the main body of the video camera; and
(2) a second memory for storing the compressed image data inputted by the first digital signal inputting and outputting means and for supplying the stored compressed image data to the second digital signal inputting and outputting means, said second memory having a capacity larger than a capacity of the first memory;
wherein the first and the second digital signal inputting and outputting means each comprises light emitting elements for converting an electric signal representing the compressed image data into a light signal and for outputting the light signal to the outside thereof and light receiving elements for converting an inputted light signal into an electric signal.

27. A video camera system comprising:
(a) a main body of a video camera including:
(1) image pickup elements for photoelectrically converting an optical image;
(2) a driving circuit for driving the image pickup elements;
(3) a signal processing circuit for forming predetermined image data by performing a predetermined signal processing on an output signal of the image pickup elements;
(4) a compression circuit for forming compressed image data by performing a predetermined data compression processing on the predetermined image data;
(5) a first memory for storing the compressed image data;
(6) a first digital signal inputting and outputting means for outputting the compressed image data read from the first memory to an outside of the main body of the video camera and for inputting the compressed image data from the outside thereof;
(7) a decompression circuit for forming image data by performing a decompression processing on the compressed image data inputted by the first digital signal inputting and outputting means;
(8) a television signal processing circuit for forming a television signal by performing a predetermined signal processing on the image data received from the decompression circuit; and
(9) a television signal outputting means for outputting the television signal to the outside of the main body of the video camera; and
(b) an external recording device including:
(1) a second digital signal inputting and outputting means attachably and detachably connected to the first digital signal inputting and outputting means of the main body of the video camera for inputting the compressed image data from the main body of the video camera and for outputting the compressed image data to the main body of the video camera; and
(2) a second memory for storing the compressed image data inputted by the first digital signal inputting and outputting means and for supplying the stored compressed image data to the second digital signal inputting and outputting means, said second memory having a capacity larger than a capacity of the first memory;
wherein the main body of the video camera further includes television signal inputting means for inputting a television signal from the outside, and the television signal processing circuit forms the image data by performing a predetermined signal processing on the television signal.

28. A video camera system comprising:
(a) a main body of a video camera including:
(1) image pickup elements for photoelectrically converting an optical image;
(2) a driving circuit for driving the image pickup elements;
(3) a signal processing circuit for forming predetermined image data by performing a predetermined signal processing on an output signal of the image pickup elements;
(4) a compression circuit for forming compressed image data by performing a predetermined data compression processing on the predetermined image data;
(5) a first memory for storing the compressed image data;
(6) a first digital signal inputting and outputting means for outputting the compressed image data read from the first memory to an outside of the main body of the video camera and for inputting the compressed image data from the outside thereof;
(7) a decompression circuit for forming image data by performing a decompression processing on the compressed image data inputted by the first digital signal inputting and outputting means;
(8) a television signal processing circuit for forming a television signal by performing a predetermined signal processing on the image data received from the decompression circuit; and
(9) a television signal outputting means for outputting the television signal to the outside of the main body of the video camera; and (b) an external recording device including:
   (1) a second digital signal inputting and outputting means attachably and detachably connected to the first digital signal inputting and outputting means of the main body of the video camera for inputting the compressed image data from the main body of the video camera and for outputting the compressed image data to the main body of the video camera; and
   (2) a second memory for storing the compressed image data inputted by the first digital signal inputting and outputting means and for supplying the stored compressed image data to the second digital signal inputting and outputting means, said second memory having a capacity larger than a capacity of the first memory;
wherein the external recording device further includes an AC adapter for forming a direct current power source from an alternating current power source and a power source output terminal for outputting direct current from the direct current power source, the main body of the video camera further includes a power source input terminal for inputting the direct current from the power source output terminal and a battery capable of being charged by being supplied with the direct current inputted via the power source input terminal, and the battery is charged while the compressed image data is being transferred from the first digital signal inputting and outputting means to the second digital signal inputting and outputting means.

29. A video camera system comprising:
(a) a main body of a video camera including:
   (1) image pickup elements for photoelectrically converting an optical image;
   (2) a driving circuit for driving the image pickup elements;
   (3) a signal processing circuit for forming predetermined image data by performing a predetermined signal processing on an output signal of the image pickup elements;
   (4) a compression circuit for forming compressed image data by performing a predetermined data compression processing on the predetermined image data;
   (5) a first memory for storing the compressed image data;
   (6) a first digital signal inputting and outputting means for outputting the compressed image data read from the first memory to an outside of the main body of the video camera and for inputting the compressed image data from the outside thereof;
   (7) a decompression circuit for forming image data by performing a decompression processing on the compressed image data inputted by the first digital signal inputting and outputting means;
   (8) a television signal processing circuit for forming a television signal by performing a predetermined signal processing on the image data received from the decompression circuit; and
   (9) a television signal outputting means for outputting the television signal to the outside of the main body of the video camera; and
(b) an external recording device including:
   (1) a second digital signal inputting and outputting means attachably and detachably connected to the first digital signal inputting and outputting means of the main body of the video camera for inputting the compressed image data from the main body of the video camera and for outputting the compressed image data to the main body of the video camera; and
   (2) a second memory for storing the compressed image data inputted by the first digital signal inputting and outputting means and for supplying the stored compressed image data to the second digital signal inputting and outputting means, said second memory having a capacity larger than a capacity of the first memory;
wherein the external recording device further includes an AC adapter for forming a direct current power source from an alternating current power source and a power source output terminal for outputting direct current from the direct current power source, the main body of the video camera further includes a power source input terminal for inputting the direct current from the power source output terminal and a battery capable of being charged by being supplied with the direct current inputted via the power source input terminal, and the battery is charged while the compressed image data is being transferred from the first digital signal inputting and outputting means to the second digital signal inputting and outputting means;
wherein the first digital signal inputting and outputting means is connected to the second digital signal inputting and outputting means and the power source output terminal is connected to the power source input terminal by mounting the main body of the video camera at a predetermined location with respect to the external recording device.

* * * * *